UNITED STATES PATENT OFFICE.

CHARLES H. HOFFMANN, OF SAN FRANCISCO, CALIFORNIA.

IMPROVEMENT IN FERTILIZING COMPOUNDS.

Specification forming part of Letters Patent No. 160,191, dated February 23, 1875; application filed September 22, 1874.

*To all whom it may concern:*

Be it known that I, CHARLES H. HOFFMANN, of San Francisco city and county, State of California, have invented a liquid manure; and I do hereby declare the following description and accompanying drawings are sufficient to enable any person skilled in the art or science to which it most nearly appertains to make and use my said invention without further invention or experiment.

My invention relates to an improved compound for fertilizing the soil, and which is also useful for germinating seeds, and for protecting seeds and plants from the ravages of insects, worms, and such small animals as are destructive to vegetable life.

To make my compound, I take three gallons of ordinary liquid manure produced by leeching or otherwise, and add to it three ounces of coarse salt and two ounces of saltpeter. I then boil the mixture for about one hour and a half, when I add three-quarters of a pound of unslaked lime. When the lime has dissolved I filter the mixture through coarse cloth, (a sack being very convenient for this purpose,) and allow it to stand until it is lukewarm. I then add to the mixture one-half ounce of stone-oil or crude petroleum and one-half ounce of sulphur-balsam, and put it into a cask for use.

Before planting seeds of any kind I soak them from eighteen to twenty-four hours in this liquid. I then take them out and allow them to dry until they will not adhere together, so that they can be sown.

In planting or sowing seeds prepared in the above manner one-half the quantity usually employed will be sufficient, and when planted or sowed neither small animals, birds, or insects will molest them. The seeds spring to life sooner, and the plants become larger and stronger.

To test the germinating quality of seeds, I take a small quantity and wrap them in a rag or cloth so that the seeds will lie loosely when placed in the liquid. After being soaked in the liquid the seed still in the sack are planted in a flower-pot and placed in a warm place. After six or seven days the sack is removed and the good seeds will be found in a sprouted condition, so that the proportion of good seeds can be easily determined.

In setting out plants I allow a little larger space than usual to each plant, especially in cabbages and cauliflowers.

Before setting the young plants out I immerse their roots in the liquid manure, after which I strew fine sand or dust upon them, so as to form a coating or shell around them, and then plant them straight in the hole, but not too deep.

Should it become necessary to protect the plant from the gophers, I take half a pint of the liquid and pour it upon the plant and in the immediate vicinity of the roots. This will prevent the animal or worms from approaching.

Plants, vines, and trees thus prepared and planted will mature two or three weeks sooner than usual, and will bear fruit sooner and of a finer quality.

Having thus described my invention, what I claim, and desire to secure by Letters Patent, is—

An improved fertilizer, composed of the common liquid manure, salt, saltpeter, lime, stone-oil, and sulphur-balsam, in the proportions substantially as herein set forth.

In witness whereof I hereunto set my hand and seal.

CHARLES H. HOFFMANN. [L. S.]

Witnesses:
 JNO. L. BOONE,
 C. M. RICHARDSON.